United States Patent
Vos et al.

(10) Patent No.: US 7,902,313 B2
(45) Date of Patent: Mar. 8, 2011

(54) PROCESS FOR THE PREPARATION OF POLY(SILYL ESTER)S, AND THEIR USES

(75) Inventors: Marcel Vos, Ijmuiden (NL); Mark Plehiers, Brussels (BE); Michel Gillard, Louvain-la-Neuve (BE)

(73) Assignee: SigmaKalon B.V., Uithoorn (NL)

( * ) Notice: Subject to any disclaimer, the term of this patent is extended or adjusted under 35 U.S.C. 154(b) by 1159 days.

(21) Appl. No.: 10/550,834

(22) PCT Filed: Mar. 26, 2004

(86) PCT No.: PCT/EP2004/003258

§ 371 (c)(1),
(2), (4) Date: Jun. 9, 2006

(87) PCT Pub. No.: WO2004/085560

PCT Pub. Date: Oct. 7, 2004

(65) Prior Publication Data

US 2006/0241240 A1    Oct. 26, 2006

(30) Foreign Application Priority Data

Mar. 26, 2003 (EP) .................................. 03251907

(51) Int. Cl.
C08G 77/04 (2006.01)
C08G 77/06 (2006.01)
C08G 77/14 (2006.01)
C08G 77/22 (2006.01)
C08G 75/00 (2006.01)
C08G 79/02 (2006.01)

(52) U.S. Cl. ............................ 528/10; 528/25; 528/26; 528/30; 528/391; 528/398

(58) Field of Classification Search ................. 556/440, 556/400, 436–437, 450, 457, 462; 528/10, 528/25–26, 30, 391, 398
See application file for complete search history.

(56) References Cited

U.S. PATENT DOCUMENTS 2,910,496 A * 10/1959 Bailey et al. ................ 556/442
3,035,016 A *  5/1962 Bruner ........................ 528/34
3,356,758 A * 12/1967 Omietanski et al. ......... 556/446
3,919,438 A * 11/1975 Urkevich .................... 427/503

(Continued)

FOREIGN PATENT DOCUMENTS

EP            1 260 513 A1    11/2002

(Continued)

OTHER PUBLICATIONS

Anderson et al., J. Org. Chem. 1716 (1953).

(Continued)

*Primary Examiner* — Randy Gulakowski
*Assistant Examiner* — Robert Loewe
(74) *Attorney, Agent, or Firm* — Goodwin Procter LLP

(57) ABSTRACT

The present invention provides a process for the preparation of poly(silyl ester)s comprising a structural unit of the formula (I) wherein the process comprises the step of reacting a polyacid of formula (II) with a polyacyloxysilyl derivative of formula (III) while removing the formed acid group(s) of formula $R_7Z(O)OH$ (IV). $R_9Z(O)OH$ (V), and $R_8Z(O)OH$ (VI) from the system.

44 Claims, 1 Drawing Sheet

Time/hours

U.S. PATENT DOCUMENTS

Figure 1:
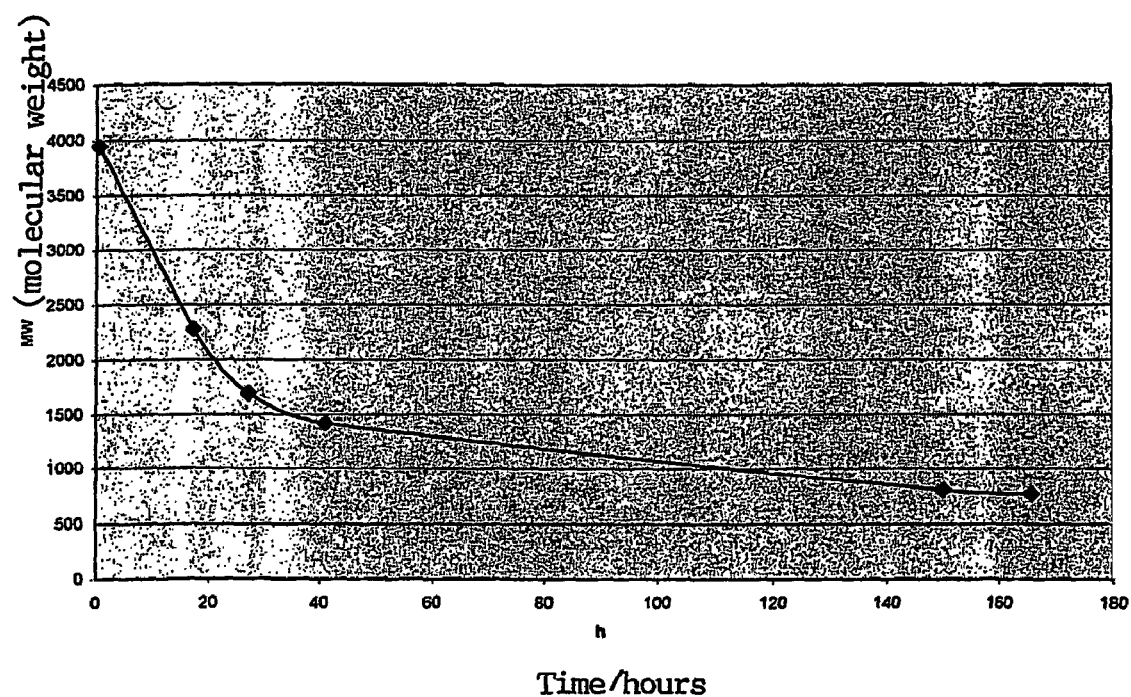

| | | | |
|---|---|---|---|
| 4,355,171 A * | 10/1982 | de Montigny et al. | 556/446 |
| 4,395,527 A * | 7/1983 | Berger | 528/26 |
| 4,584,360 A * | 4/1986 | Paul et al. | 528/14 |
| 4,663,413 A * | 5/1987 | Ward et al. | 528/26 |
| 4,699,967 A * | 10/1987 | Eichenauer et al. | 528/29 |
| 4,826,946 A * | 5/1989 | Eichenauer et al. | 528/14 |
| 4,876,169 A * | 10/1989 | Gruber et al. | 430/109.4 |
| 4,894,427 A * | 1/1990 | Yamamoto et al. | 528/26 |
| 5,051,489 A * | 9/1991 | O'Lenick, Jr. | 528/26 |
| 5,126,495 A * | 6/1992 | Serini et al. | 528/21 |
| 5,210,133 A * | 5/1993 | O'Lenick, Jr. | 525/54.1 |
| 5,888,485 A * | 3/1999 | O'Lenick et al. | 424/64 |
| 2002/0156224 A1 | 10/2002 | Arimura et al. | |

FOREIGN PATENT DOCUMENTS

| | | | |
|---|---|---|---|
| GB | 2170814 A * | 8/1986 | |
| JP | 07-070152 | 3/1995 | |
| WO | WO 03/105920 A1 | 12/2003 | |

OTHER PUBLICATIONS

Gitto et al., Macromolecules (1995) 28, 8887.
Wang et al., Macromolecules (1998) 31, 7606.
Wang et al. J. Polym. Sci., Part A: Polym. Chem. (1999) 37, 3606.
Weinberg et al., Macromolecules (1998) 31, 15.
Weinberg et al., J. Organomet. Chem. (1997) 542, 235.
Wang et al., Macromolecules (2000) 33, 734.
Wang et al., J. Organomet. Chem. (2001) 34, 3215.
H. H. Anderson et al., J. Org. Chem. 1296 (1954).
Izv. Akad. Nauk. Ussr. Ser. Khim. 968 (1957).

* cited by examiner

US 7,902,313 B2

PROCESS FOR THE PREPARATION OF POLY(SILYL ESTER)S, AND THEIR USES

CROSS-REFERENCE TO RELATED APPLICATIONS

This is a national phase filing of International Application No. PCT/EP2004/003258, which was filed on Mar. 26, 2004 and published in English on Oct. 7, 2004, and claims priority of European Patent Application No. 03251907.6 filed on Mar. 26, 2003.

BACKGROUND OF THE INVENTION

The present invention relates to a new method for the preparation of poly(silyl ester)s. The invention further relates to novel poly(silyl ester)s, and in another aspect, the invention further relates to the use of hydrolysable poly(silyl ester)s where the use of hydrolysable silyl ester groups is advantageous.

Poly(silyl ester)s possess a variable yet predictable degradation behaviour and as such, have a broad range of potential applications wherever the presence of hydrolysable groups is advantageous. For instance, it is known to use degradable polymers in general in the medical, environmental, biomedical, and agricultural areas, wherein the ability of the polymers to break down into biologically or environmentally resorbable small-molecule byproducts is of great use. WO 03/105920 discloses the use of polymer containing coating compositions for medical implant devices. Poly(silyl ester) compositions are believed by the present inventors to represent viable alternatives to the compositions disclosed therein.

Another application is as a resin or co-resin for self-polishing antifouling paints, for instance, as binders for modern antifouling coatings, although the use of hydrolysable poly(silyl ester)s, as noted above, will have many applications where the fact that the degradation behaviour can be affected by the nature of the functionality attached to the silicon atoms would be a positive advantage.

Trialkylsilylcarboxylates of aliphatic carboxylic acids can be obtained by transesterification. H. H. Anderson et al describe in J. Org. Chem 1716 (1953) the reactions of triethyl silyl acetates and diethyl silyl diacetates with halogenated propionic acids and in J. Org. Chem. 1296 (1954) the reactions of dimethylsilyl di(trifluoro acetate) or dimethylsilyl dipropionate with chloroacetic acid; they distill the acetic, propionic or trifluoroacetic acid under reduced pressure.

Russian chemists (Izv.Akad.Nauk.Ussr.Ser.Khim. 968 (1957)) run similar reactions but at much higher temperatures (190-210° C.)

JP 95070152 A discloses reactions of trialkylsilylacetates with C6 to C30 carboxylic acids (e.g. palmitic, myristic, benzoic, . . . ); the acetic acid is distilled under reduced pressure or azeotropically with hexane.

Poly(silyl ester)s are characterised by the fact that they comprise more than one silyl carboxylate unit in the oligomeric/polymeric backbone. In other words, poly(silyl ester)s contain —Si—O—C(O)— linkages along the polymer backbone, and are a class of degradable polymer systems with a variable, yet predictable, degradation behaviour.

Silyl ester functionalities have been prepared by many routes and therefore it may have been envisaged that the synthesis of poly(silyl ester)s would be relatively straightforward. However, problems such as salt formation, side reactions, monomer insolubility/impurity, and/or incomplete reaction, ensured that many of the envisaged polymer syntheses were not in fact suitable. Indeed, it is only recently that the incorporation of acyloxysilane groups in a polymer backbone has actually been achieved.

Wooley et al have developed and disclosed synthetic routes for the preparation of poly(silyl ester)s, including transsilylation esterification of AA/BB comonomers (see Macromolecules (1995) 28 8887; Macromolecules (1998) 31 7606; J. Polym. Sci., Part A Polym. Chem. (1999) 37 3606, Macromolecules (1998), 31 15; and J. Organomet. Chem. (1998). 542 235), transsilylation esterification of AB monomers (see Macromolecules (2000) 33 734; and J. Organomet. Chem. (1998) 542 235), hydrosilylation of AB monomers (see Macromolecules (2000) 33 734), and cross-dehydrocoupling polymerisation of AB and $AB_2$ monomers (see Macromolecules (2001) 34 3215, and references cited therein).

For example, the transilylation ester interchange reaction of chlorosilanes with TMS-blocked silyl esters at temperatures in the range of 100-135° C. for 10-14 days, leading to the formation of corresponding polymers with the concomitant distillation of trimethylsilyl chloride, using, for example, N,N-dimethylformamide (DMF) as a catalyst, has been described by Wooley et al, in Macromolecules (1998) 31 15. This method does have its advantages; no base is required, and the trimethylsilyl chloride by product is volatile. Moreover, the reaction proceeds at relatively low temperatures, and without the addition of a solvent. However, TMS-blocked silyl esters are expensive reagents and the release of trimethylsilyl chloride is harmful to the environment.

Another method described by Wooley et al in Macromolecules (2000) 33 734 and Macromolecules (2001) 34 3215 is the polymerisation accomplished via hydrosilylation between a silyl hydride function and a carbon/carbon double bond or a carboxylic acid function present in the same molecule (AB monomer system) or in different molecules (AA/BB monomer system). This method suffers from the disadvantages of requiring the use of transition metal catalysts such as platinum or, palladium derivatives ($Pt(COD)Cl_2$; Pd/C) in order to generate hydrogen when carboxylic acid functions are involved and the limited accessibility of the starting materials.

Therefore, there remains the need to find a novel method for the preparation of poly(silyl ester)s avoiding or at least alleviating the aforementioned problems associated with the prior art methods of synthesising hydrolyzable poly(silyl ester)s.

BRIEF SUMMARY OF THE INVENTION

Therefore, an object of the present invention is to provide a novel process capable of readily preparing poly(silyl ester)s in a high yield from easily and readily available starting materials.

Another object of the present invention is to provide a more efficient process for the preparation of poly(silyl ester)s compared to those previously disclosed methods discussed above.

A further object of the present invention is to provide a novel process for the preparation of poly(silyl ester)s, which proceeds at an acceptable rate even without the presence of any added catalyst.

A yet further object of the present invention is to provide a novel process for the preparation of poly(silyl ester)s wherein only harmless and easily distillable molecules are released.

A yet still further object of the present invention is to provide a novel process for the preparation of poly(silyl ester)s wherein the degree of conversion of the starting materials to the target product may be monitored by conventional analytical tools and/or by determining the amount of distilled molecules released.

Thus, overall, the object of the present invention is to provide a novel process for the preparation of poly(silyl ester)s offering some improvement vis-à-vis the disadvantages disclosed hereinbefore.

DETAILED DESCRIPTION OF THE INVENTION

The present invention is based on the reaction of polyacids (and by "polyacids" we mean an organic moiety comprising at least two acid groups; for example, at least two carboxylic, sulphuric, phosphoric, and the like, acid groups; preferably, we mean polycarboxylic acids) with polyacyloxy silyl derivatives to synthesise poly(silyl ester)s by silyl ester transesterification. The use of polyacids and the technique of transesterification in the synthesis of poly(silyl ester)s was unexpected as hitherto, the technique of transesterification had only been used to synthesise organosilylated carboxylate monomers, and previously disclosed methods of synthesising poly(silyl ester)s were either found to be ineffective at polymer formation or used expensive reactants and/or produced harmful by products and/or required an added catalyst and/or could not be followed easily by conventional analytic tools.

The present inventors have surprisingly found that by reacting polyacids with polyacyloxysilyl derivatives, poly (silyl ester)s could be synthesised.

According to a first aspect, the present invention relates to a new process for the preparation of poly(silyl ester)s comprising a structural unit of the formula (I)

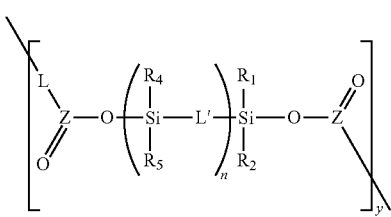

wherein each $R_4$ and $R_5$ may be hydroxyl or may be independently selected from hydrogen, alkyl, cycloalkyl, aryl, alkoxy, aryloxy, -L'-SiR$_1$R$_2$—, -L'-SiR$_4$R$_5$R$_{10}$, -L'-(SiR$_4$R$_5$L')$_n$-SiR$_1$R$_2$—, alkenyl, alkynyl, aralkyl or aralkyloxyl radicals optionally substituted by one or more substituents independently selected from the group comprising alkyl, alkoxyl, aralkyl, aralkyloxyl, hydroxyl, aryl, aryloxyl, halogen, amino (preferably, tertiary amino) or amino alkyl radicals, or $R_4$ or $R_5$ may, independently be an —O—Z(O)-L- group, where $R_{10}$ is defined as is, $R_7$ below, wherein each $R_1$ and $R_2$ may independently represent hydrogen, hydroxyl, alkyl, cycloalkyl, alkenyl, alkynyl, alkoxyl, -L'-SiR$_4$R$_5$R$_{10}$, aryl, aryloxyl, aralkyl or aralkyloxyl radical optionally substituted by one or more substituents independently selected from the group comprising alkyl, alkoxyl, aralkyl, aralkyloxyl, aryl, aryloxyl, halogen, hydroxyl, amino (preferably, tertiary amino) or amino alkyl radicals, or $R_1$ or $R_2$ may independently be an —O—Z(O)-L- group, wherein L represents a hydrocarbyl or substituted, hydrocarbyl group, wherein said substituted hydrocarbyl is substituted by one or more substituents independently selected from the group comprising alkyl, cycloalkyl, carboxyl, substituted carboxyl, alkoxyl, aralkyl, aralkyloxyl, aryl, aryloxyl, hydroxyl, halogen, amino or amino alkyl radicals, or a polymer with pendant acid groups, L' represents O, S, or NR$_6$, L-(NR$_6$-L)$_p$ (where p=1 to 10), where R$_6$ is defined as is R$_7$ below, or L, each n independently represents a number of —Si(R$_4$) (R$_5$)-L'- groups from 0 to 1000, and y represents a number of silyl ester repeat units from 2 to 100000, more preferably 2 to 10000, most preferably 2 to 1000, which process comprises the step of reacting;

a polyacid of formula (II)

wherein Z(O)OH represents the acid moiety attached to L, m is an integer from 2 to 100000, preferably 2, and L is as defined above, with a polyacyloxysilyl derivative of formula (III)

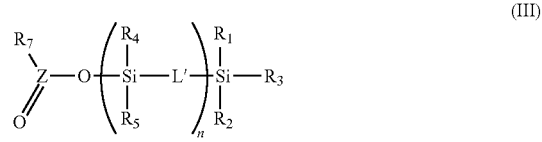

wherein $R_1$, $R_2$, $R_4$, $R_5$, L' and n are as defined above, except $R_1$, $R_2$, $R_4$ and $R_5$ in (III) are —O—Z(O)—R$_8$, where R$_8$ is defined as is R$_7$ below, when the equivalent group in (I) is —O—Z(O)-L-, and R$_7$ is a hydrogen atom, an aralkyl, aryl, alkenyl, alkynyl, or alkyl group optionally substituted with one or more substituents selected from the equivalent substituents as defined for $R_1$, $R_2$, $R_4$ and $R_5$ above, and $R_3$ is the group —O—Z(O)—R$_9$, where R$_9$ is (defined as is R$_7$ above, whilst removing the formed acid group(s) of formula (IV) and (V) and (VI),

$$R_7Z(O)OH \quad \text{(IV),}$$

$$R_9Z(O)OH \quad \text{(V),}$$

$$R_8Z(O)OH \quad \text{(VI),}$$

from the system.

Essentially, it is required that the polyacyloxysilyl derivative is such that there is more than one acyloxy group attached to one or several silicon atoms. Moreover, when n=0 there are a maximum of four acyloxy groups on the silicon atom; and when n>0, the terminal silica atoms have a maximum of three acyloxy groups and the non-terminal silicon atoms a maximum of two acyloxy groups.

Suitably, the poly(silyl ester)s comprising a structural unit of formula (I) will terminate with the groups —SiR$_1$R$_2$R$_3$, and —O—Z(O)—R$_7$.

In cases wherein m is greater than 2, i.e. in cases where the polyacid contains more than 2 (Z(O)OH) groups, then L in formula (I) will have attached thereto the (Z(O)OH) groups in excess of 2, pendant acid groups, and therefore polymerisation with the polyacyloxysilyl derivative can further occur from this/these additional (Z(O)OH) sites.

Preferably, wherein $R^1$, $R^2$, $R^4$ and $R^5$ are alkoxyl, aryloxyl, alkaryloxyl or hydroxyl in formula (III), they may represent —O—Z(O)-L- in formula (I).

Preferably; $R_4$ and $R_5$ each independently represent an alkyl, an alkoxyl, an aryl, an hydroxyl group or an -L'-$(SiR_4R_5L')_n$-$SiR_1R_2$— group, wherein L', $R_1$, $R_2$, $R_4$ and $R_5$ are as defined above and wherein preferably, n=0-100 and more preferably, n=0-10, most preferably n=0 but is also possibly 1, 2, 3, 4 or 5, preferably 1.

More preferably, $R_4$ and $R_5$ in formula (III) are each independently selected from the group comprising an alkyl group, an hydroxyl group, an alkoxyl group or an -L'-$(SiR_4R_5L')_n$-$SiR_3R_2$— group, wherein L', $R_1$, $R_2$, $R_4$ and $R_5$ are as defined above. Most preferably, $R_1$, $R_2$, $R_4$ and $R_5$ each independently represent an alkyl group. The said alkyl groups may be branched or linear.

Preferably L' represents O.

Preferably Z represents C, POH, P or S═O, more preferably, C. For example, each Z in formula (II) or (III) may preferably independently represent C, POH, P or S═O, more preferably, C. For the avoidance of any doubt, when Z is not C, the term polyacyloxysilyl is to be construed/amended accordingly.

According to an embodiment of the present invention, $R_1$, $R_2$, $R_4$, $R_5$ and $R_8$ are each independently selected from the group comprising methyl, ethyl, propyl, isopropyl, isobutyl, n-butyl, sec-butyl, t-butyl, phenyl, and vinyl. Preferably $R_1$, $R_2$, $R_4$ and $R_5$ are selected from the group consisting of methyl, ethyl, isopropyl, phenyl, and vinyl. More preferably, $R_1$, $R_2$, $R_4$, $R_5$ and $R_8$ are methyl.

Preferably, the groups $R_1$ and $R_2$ are the same. Equally preferably, the groups $R_7$ and $R_9$ are the same, more preferably an alkyl group, most preferably methyl.

Preferably, $R_7$ and $R_9$ each represent an alkyl group, more preferably methyl.

Preferably, $R_6$ is alkyl, most preferably methyl.

When $R_4$ and $R_5$ are alkoxyl, they are preferably $C_1$-$C_8$ oxyl groups which may be branched or linear, more preferably, is $C_1$-$C_4$ oxyl groups, most preferably, a methoxyl group.

Preferably, when $R_4$ or $R_5$ is selected as -L'-$(SiR_4R_5L')_n$-$SiR_1R_2$—, the $R_4$ and $R_5$ groups attached to the silicon radical in the selected group are not themselves, -L'-$(SiR_4R_5L')_n$-$SiR_1R_2$—.

Preferably, n as used herein each independently represent 0 to 500, more preferably 0 to 100, most preferably 0 to 10, Especially preferred values for n are selected from 0, 1, 2, 3, 4 or 5, most especially from 0 and 1.

The process of the invention enables one to obtain poly(silyl ester)s by reacting polyacids, preferably polycarboxylic acids, with polyacyloxysilyl derivatives.

The present invention relates to a new process for the synthesis of poly(silyl ester)s according to the general scheme whereby a polyacyloxysilyl derivative of formula (III), is reacted with a polyacid, preferably a polycarboxylic acid, of formula (II) and comprising at least two acid groups, preferably two carboxylic acid groups, to form poly(silyl ester)s comprising a structural unit of formula (I).

The reactants are mixed together either with or without solvents. Preferably, the reaction is carried out in a suitable solvent. Suitable solvents which can be used in the process of the invention include non polar inert solvents, cyclic and non-cyclic aliphatic hydrocarbons, cyclic and non-cyclic ethers, esters, and the like. Examples of suitable solvents which can be used in the process according to the invention include pentane, cyclopentane, hexane, cyclohexane, heptane, toluene, xylene, benzene, mesitylene, ethylbenzene, octane, decane, decahydronaphthalene, diethyl ether, diisopropyl ether, diisobutyl ether, N,N-dimethylformamide, N-methylpyrrolidone, N,N-dimethylacetamide, and the like and mixtures thereof.

Preferred solvents are those which cause no distillation of any of the reactants, especially those solvents which allow preferential distillation of one of the products. Thus, a more especially preferred solvent is a solvent which forms a low boiling azeotrope with the distilled acid product of the process of the invention. Still more especially preferred solvents are those which form a heterogeneous low boiling azeotrope with the distilled acid product.

More preferably, the solvents are independently selected from pentane, hexane, cyclohexane, heptane, toluene and xylene.

Preferably, the temperature of the reaction depends on the boiling point of the acid or its azeotrope that has to be distilled, the shape of the reactor and the height of the distillation column.

Typically, the reaction is carried out in the range 0° C.-200° C., more preferably, 60-190° C., most preferably, 110-180° C.

Preferably, the molar ratio of the reactive groups present in the polyacyloxysilyl derivative and the polyacid is between 1:100 and 100:1, more preferably between 10:1 and 1:10, most preferably, between 2:1 and 1:2. Preferably, the molar ratio of acyloxy group:acid group is approximately 1:1.

Preferably, the solvent, where present, is at least 10 wt % of the total reaction mix at the start of the reaction, more preferably, at least 20 wt %, most preferably, at least 30 wt %. The reaction may be carried out at atmospheric pressure although both higher and lower pressures are also possible.

The reaction may also be performed without solvent and accordingly suitable ranges of solvent are 0-99 wt % of the total, reaction mix, more preferably, 20-50-wt %, most preferably 30-4.0 wt %.

In a preferred embodiment, L represents or is derived from an alkyl, aryl, alkenyl, alkynyl, or aralkyl radical or may represent a polymer, preferably comprising 1 to 10000 carbon atoms, more preferably 1 to 1000 carbon atoms, most preferably 1 to 100 carbon atoms.

In a further preferred embodiment, L represents —$(CH_2)_n$—, wherein n is an integer between 1 and 10, preferably between 2 and 8, more preferably between 4 and 6, most preferably 4, or in a further embodiment, L represents a lactic acid or rosin residue, for example the non-carboxylic acid portions, or portions minus two of the carboxylic acid groups present, of a polylactic or substituted polylactic acid, e.g. di-lactic acid, rosin and/or rosin derivatives, e.g. DYMEREX® (rosin dimer).

The reaction progress may be monitored by any suitable analytical method as well as with the determination of the amount of acid distilled.

Although any dicarboxylic or, more, generally, polycarboxylic acid, or even polyacid, of formula (II) may be used in the process according to the invention, dicarboxylic acids are preferred, and preferred examples of dicarboxylic acids are adipic acid, oxalic acid, succinic acid, glutaric acid, phthalic or isophthalic or terephthalic acids, and the like, a polylactic acid such as di-lactic acid, and rosinous dicarboxylic acids such as DYMEREX® (rosin dimer), or polymer thereof. Moreover, formula (II) may represent a polymeric polyacid.

The polyacyloxysilyl derivatives which can be used in the process according to the invention are preferably those derived from carboxylic 'acids having a boiling point' of maximum 162° C., preferably of maximum 140° C., more preferably of maximum 120° C., in order to facilitate the removal of the product after the transesterification. Examples of suitable carboxylic acids are formic acid, acetic acid, propionic acid and butyric acid. Formic acid and acetic acid with respectively 100° C. and 118° C. as boiling points are preferred, with acetic acid being particularly preferred.

In another embodiment of the invention the polyacyloxysilyl derivatives are derived from partially, or totally halogenated, acids, preferably from fluorinated or chlorinated acids, more preferably from trifluoroacetic acid with 70° C. as boiling point.

The polyacyloxysilyl derivatives for use in the process of the invention are known (see table) or can be obtained by known methods. Some non-limiting examples are given in the following table:

| polyacyloxysilyl derivative | CAS registry number |
| --- | --- |
| tetramethyl-1,3-diacetoxydisiloxane | 5314-58-9 |
| dimethyldiacetoxysilane | 2182-66-3 |
| diethyldiacetoxysilane | 18269-81-3 |
| diphenyldiacetoxysilane | 2565-07-3 |
| vinylmethyldiacetoxysilane | 2944-70-9 |
| methyltriacetoxysilane | 4253-34-3 |
| ethyltriacetoxysilane | 17689-77-9 |
| vinyltriacetoxysilane | 4130-08-9 |
| phenyltriacetoxysilane | 18042-54-1 |
| tetraacetoxysilane | 562-90-3 |
| butanoic acid, 1,3,5-triethyl-1,3,5-tripropyl-1,5-trisiloxanediyl ester | 34740-39-1 |
| 1,5-trisiloxanediol, 1,3,5-triethyl-1,3,5-tripropyl-, dipropanoate | 34732-57-5 |
| 2-silanaphthalen-2-ol, 1,2,3,4-tetrahydro-2-(7-hydroxy-1,1,3,3,5,5,7,7-octamethyltetrasiloxanoxy)-, diacetate | 33002-43-6 |
| 2-silanaphthalen-2-ol, 1,2,3,4-tetrahydro-2-(5-hydroxy-1,1,3,3,5,5-hexamethyltrisiloxanoxy)-, diacetate | 33002-42-5 |
| 2-silanaphthalen-2-ol, 1,2,3,4-tetrahydro-2-(3-hydroxy-1,1,3,3-tetramethyldisiloxanoxy)-, diacetate | 33002-41-4 |
| 1,9-pentasiloxanediol, 1,3,5,7,9-pentamethyl-1,3,5,7,9-pentavinyl-, diacetate | 23174-06-3 |
| 1,7-tetrasiloxanediol, 1,3,5,7-tetraethenyl-1,3,5,7-tetramethyl-, diacetate | 23174-05-2 |
| 1,7-tetrasiloxanediol, 1,1,3,3,5,5,7,7-octaethyl-, diacetate | 23174-10-9 |
| 1,5-trisiloxanediol, 1,3,5-triethenyl-1,3,5-trimethyl-, diacetate | 23174-04-1 |
| heptasiloxane, 1,1,1,13-tetraacetoxy-3,3,5,5,7,7,9,9,11,11,13,13-dodecamethyl | 22306-76-9 |
| 1,5-trisiloxanediol, 1,3,5-triethyl-1,3,5-trimethyl-, diacetate | 21982-13-8 |
| 1,5-trisiloxanediol, 1,1,3,3,5,5,-hexaethyl-, dibutyrate | 21961-88-6 |
| 1,5-trisiloxanediol, 1,1,3,3,5,5-hexaethyl-, dipropionate | 21961-87-5 |
| 1,5-trisiloxanediol, 1,3,5-triethyl-1,3,5-tripropyl-, diacetate | 21961-86-4 |
| 1,5-trisiloxanediol, 1,1,3,3,5,5-hexaethyl-, diacetate | 21961-85-3 |
| 1,1,1,7-tetrasiloxanetetrol, 3,3,5,5,7,7-hexamethyl-, triacetate | 19363-46-3 |
| 1,5-trisiloxanediol, 1,1,3,5,5-pentamethyl-3-vinyl-, diacetate | 18038-26-1 |
| 1-tetrasiloxanol, 7-acetyl-1,1,3,3,5,5,7,7-octamethyl-, acetate | 6990-26-7 |
| 1-pentasiloxanol, 9-acetyl-1,1,3,3,5,5,7,7,9,9-decamethyl-+, acetate; pentasiloxanol, 9-acetyl-1,1,3,3,5,5,7,7,9,9-decamethyl-, acetate | 6904-56-9 |
| 1,9-pentasiloxanediol, decamethyl-, diacetate | 5314-61-4 |
| 1,5-trisiloxanediol, hexamethyl-, diacetate | 5314-59-0 |
| 1,17-nonasiloxanediol, octadecamethyl-, diacetate | 3527-48-8 |
| 1,15-octasiloxanediol, hexadecamethyl-, diacetate | 3454-14-6 |
| 1,7,13-heptasiloxanetriol, tridecamethyl-, triacetate | 3293-05-8 |
| 1,1,7-tetrasiloxanetriol, 1,3,3,5,5,7,7-heptamethyl-, triacetate | 3293-04-7 |
| 1,13-heptasiloxanediol, tetradecamethyl-, diacetate | 3293-03-6 |
| 1,7-tetrasiloxanediol, 1,1,3,3,5,5,7,7-octamethyl-, diacetate | 3293-02-5 |
| ditert-butyldiacetotoxysilane | 168153-12-6 |
| ditert-butoxydiacetoxysilane | 13170-23-5 |

Suitably, there is no limit on the molecular weight of the final product. However, the molecular weight is preferably in the range 1000 to 1000000 kD, more preferably 1000 to 100000 kD, most preferably 1000 to 10000 kD.

Drawdowns of resins obtained by the process of the invention may be dried at temperatures in the range, 0-150° C., preferably 18-100° C., more preferably 19-35° C.

As used herein, the term "polymer" refers to the product of a polymerisation reaction, and is inclusive of homopolymers, copolymers, e.g. polysilanols, polyols, polyamines, etc. (which can react/esterify with the polyacid and/or polyacyloxysilanes; in the case of polysilanols, the non-hydrolysable Si—O bond will be part of the polymer), terpolymers, etc.

As used herein, the term "independently selected" or "independently represent" indicates that each radical, e.g. R, so described, can be identical or different.

The term "alkyl", as used herein and unless otherwise defined, relates to saturated hydrocarbon radicals having straight, branched, cyclic or polycyclic moieties or combinations thereof and contains 1 to 20 carbon atoms, preferably 1 to 10 carbon atoms more preferably 1 to 8 carbon atoms, still more preferably 1 to 6 carbon atoms, yet more preferably 1 to 4 carbon atoms. Said radicals may be substituted, i.e. optionally substituted with one or more substituents independently selected from alkyl, alkoxy, halogen, hydroxy or amino radicals. Examples of such radicals include and may be independently selected from methyl, ethyl, n-propyl, isopropyl, n-butyl, isobutyl, sec-butyl, tert-butyl, 2-methylbutyl, 2,3-dimethylbutyl, lauryl, pentyl, iso-amyl, n-amyl, n-hexyl, cyclohexyl, 3-methylpentyl, n-octyl, t-octyl, n-dodecyl, and the like.

The term "alkynyl" as used herein and unless otherwise defined, relates to hydrocarbon radicals having one or several triple bonds, having straight, branched, polycyclic or cyclic moieties or combinations thereof and having from 2 to 18 carbon atoms, preferably 2 to 10 carbon atoms, more preferably from 2 to 8 carbon atoms, still more preferably from 2 to 6 carbon atoms, yet more preferably 2 to 4 carbon atoms. Examples of alkynyl radicals include ethynyl, propynyl, (propargyl), butynyl, pentynyl, hexynyl and the like.

The term "aryl", as used herein and unless otherwise defined, relates to an organic radical derived from an aromatic hydrocarbon by removal of one hydrogen, and includes any monocyclic, bicyclic or polycyclic carbon ring of up to 7 members in each ring, wherein at least one ring is aromatic. Said radical may be optionally substituted with one or more substituents independently selected from alkyl, alkoxy, halogen, hydroxy or amino radicals. Examples of aryl includes phenyl, p-tolyl, 4-methoxyphenyl, 4-(tert-butoxy)phenyl, 3-methyl-4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl tetrahydronaphthyl, indanyl, biphenyl, phenanthryl, anthryl or acenaphthyl and the like.

The term "alkenyl", as used herein and unless otherwise defined, relates to hydrocarbon radicals having one or several double bonds, having straight, branched, cyclic or polycyclic moieties or combinations thereof and containing from 2 to 18 carbon atoms, preferably 2 to 10 carbon atoms, more preferably from 2 to 8 carbon atoms, still more preferably 2 to 6 carbon atoms, yet more preferably 2 to 4 carbon atoms. Said radicals may be substituted, i.e. optionally substituted with one or more substituents independently selected from alkyl, alkoxy, halogen, hydroxy or amino radicals. Examples of alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isopenyl, farnesyl, geranyl, geranylgeranyl and the like.

The term "aralkyl", as used herein and unless otherwise defined, relates to a group of the formula alkyl-aryl, in which alkyl and aryl have the same meaning as defined above. Said radicals may be substituted, i.e. optionally substituted with one or more substituents, independently selected from alkyl, alkoxy, halogen, hydroxy or amino radicals. Examples of aralkyl radicals include benzyl, phenethyl, dibenzylmethyl, methylphenylmethyl, 3-(2-naphthyl)-butyl, and the like.

Examples of the or each carboxyl radical part of formula (III), $R_7C(O)$, $R_8C(O)$ and $R_9C(O)$, may include but are not limited to formyl, acetyl, propionyl, butyryl, pivaloyl, oxaloyl, malonyl, succinyl, glutaryl, adipoyl, benzoyl, phthaloyl, isobutyroyl, sec-butyroyl, octanoyl, isooctanoyl, nonanoyl, isononanoyl, abietyl, dehydroabietyl, dihydroabietyl, naphtenyl, anthracenyl, abietyl dimer (DYMEREX®), dihydroabietyl (FORAL®) and the like and polymers or copolymers thereof. In a preferred embodiment, said carboxyl radical parts are formyl, acetyl, propionyl or butyryl. Most preferably, the carboxyl radical part is acetyl.

The advantage of the process of the invention is that the process uses reactants which can be easily handled, are relatively inexpensive, and do not result in the emission by distillation of any harmful products. Indeed, only harmless and easily distillable acids, for example carboxylic acids, are released, thus allowing for the degree of conversion of the starting materials to the target products to be monitored by conventional analytical tools and/or by determining the amount of distilled carboxylic acid released. A further advantage is that the formed acid(s), e.g. carboxylic acids, may be removed, preferably, under distillation, preferably azeotropic distillation. A yet further advantage is that the reaction proceeds either with or without a solvent present. Moreover, the process proceeds at an acceptable rate without the need for any added catalyst. Overall, due to the simplicity and shortness, its easy work-up procedure and its high yield, the process of the present invention can be considered as a significant and substantial improvement over the existing methods. In addition, the claimed synthesis route can be carried out at high temperatures and is therefore quick and efficient.

As noted above, the polymers formed by the process of the invention have a broad range of applications wheresoever there is the need for hydrolysable poly(silyl ester)s groups. The polymers thus formed exhibit a variable but predictable degradation behaviour and as such, have many potential applications. Such applications include antifouling coating applications. A further application is in the controlled release of substances, for example volatile compounds such as perfumes, fragrances or insecticides. This may be achieved by employing a resin prepared according to the invention and the volatile compound may be blended or grafted thereto. Degradable polymers have previously been used in, the medical and environmental fields in view of the fact they can be synthesised with the requisite physical and mechanical properties to firstly perform a given function and then breakdown into biologically or environmentally resorbable small-molecule byproducts. In the medical field, the nature of the side-group on degradable polymers can create functional materials having the ability to bind to specific sites, and so on.

There are a number of applications in which a foreign body such as a metal or plastics device is implanted in a human or animal body, particularly a human body as part of a treatment. For example, broken bones may be pinned or worn out joints replaced with artificial joints.

It is desirable when metal or plastics devices are to be implanted in the body to provide such devices with a means of reducing the potential for infection or other complications. Complications associated with the use of implants include initiation of a foreign body response resulting in inflammation and fibrous encapsulation and initiation of a wound healing response resulting in hyperplasia and restenosis, as well as of course the increased risk of infection. Such complications must be addressed when introducing an implant into the body.

For example, it is desirable to provide implant devices with a means for releasing a bioactive compound in their vicinity once implanted. Some such devices are known and may for example release antibiotics to minimise the possibility of infection. Alternatively, or additionally, anti-proliferative drugs may be released to inhibit hyperplasia.

An implant device may be provided with a means for releasing a bioactive compound by applying a coating composition comprising, a bioactive agent and polymers. There is a continuing need for alternative and improved coating compositions for use with implant devices.

Therefore, according to a second aspect of the present invention, there is provided a coating or film composition comprising a poly(silyl ester) as prepared or obtainable by the process hereinbefore defined.

Suitably, the coating or film composition comprises an antifouling coating composition.

The coating or film composition may comprise a coating composition suitable for use in medical and/or veterinary applications. The coating compositions may comprise a coating composition for implantable medical and/or veterinary devices. The coating composition may be arranged to provide controlled release of an active agent, preferably a bioactive agent, in an aqueous system, for example a human or animal body.

The coating composition may comprise an active agent. The active agent may comprise a bioactive agent. The bioactive agent may comprise an antibiotic and/or an anti-proliferative.

The bioactive (e.g. pharmaceutical) agents useful in the present invention include virtually any therapeutic substance which possesses desirable therapeutic characteristics for application to the implant site. These agents include: thrombin inhibitors, antithrombogenic agents, thrombolytic agents, fibrinolytic agents, vasospasm inhibitors, calcium channel blockers; vasodilators, antihypertensive agents, antimicrobial agents, calcium channel blockers, vasodilators, antihypertensive agents, antimicrobial agents, antibiotics, inhibitors of surface glycoprotein receptors, antiplatelet agents, antimitotics, microtubule inhibitors, antisecretory agents, actin inhibitors, remodelling inhibitors, antisense nucleotides, anti metabolites, antiproliferatives (including antiangiogenesis agents), anticancer chemotherapeutic agents, anti-inflammatory steroid or non-steroidal anti-inflammatory agents, immunosuppressive agents, growth hormone antagonists, growth factors, dopamine agonists, radiotherapeutic agents, peptides, enzymes, extracellular matrix components, ACE inhibitors, free radical scavengers, chelators, antioxidants, anti polymerases, antiviral agents, photodynamic therapy agents, and gene therapy agents.

According to a third aspect of the present invention there is provided a film or coating comprising a poly(silyl ester) as prepared or obtainable by the process hereinbefore defined.

Moreover, and according to a fourth aspect of the present invention, there is provided a poly(silyl ester) as prepared by the process hereinbefore defined.

According to a fifth aspect of the present invention there is provided an implantable medical and/or veterinary device having a coating comprising a coating or film composition comprising a poly(silyl ester) as prepared by the process hereinbefore described.

Suitably, the coating is arranged to provide controlled release of an active agent, preferably a bioactive agent, in an aqueous system.

Suitably, the device comprises an implantable medical device.

Finally, certain of the poly(silyl ester)s hereinbefore disclosed are themselves novel and form a further aspect of the present invention.

Thus, according to a sixth aspect of the present invention, there is provided a poly(silyl ester) compound comprising the repeating group of general formula (I) hereinbefore defined, and wherein L is a polylactic acid or substituted polylactic acid residue or a rosin or, substituted rosin residue of a polycarboxylic acid.

According to a seventh aspect of the present invention there is provided a coating or film composition comprising a poly(silyl ester) compound comprising the repeating group of general formula (I) hereinbefore defined, and wherein L is a polylactic acid or substituted polylactic acid residue or a rosin or substituted rosin residue of a polycarboxylic acid.

According to an eighth aspect of the present invention there is provided a film or coating comprising a poly(silyl ester) compound comprising the repeating group of general formula (I) hereinbefore defined, and wherein L is a polylactic acid or substituted polylactic acid residue or a rosin or substituted rosin residue of a polycarboxylic acid.

According to a ninth aspect of the present invention there is provided an implantable medical and/or veterinary device having a coating comprising a coating or film composition according to the seventh aspect.

The second, third, fourth, fifth and sixth aspects of the present invention may incorporate any one or more of the preferred features of the first aspect of the invention except where such features are mutually exclusive.

The seventh aspect of the present invention may incorporate any one or more of the preferred features of the second aspect of the invention except where such features are mutually exclusive. The eighth aspect of the present invention may incorporate any one or more of the preferred features of the third aspect of the invention except where such features are mutually exclusive. The ninth aspect of the present invention may incorporate any one or more of the preferred features of the fifth aspect of the invention except where such features are mutually exclusive.

The invention will now be described by way of illustration only and with reference to the accompanying non-limiting examples and attached drawings.

EXAMPLES AND COMPARATIVE EXAMPLES

Preparative Example 1

1,3-diacetoxytetraisopropyldisiloxane was prepared in an analogous manner to that method disclosed by Volkova et al (see, Bull. Acad. Sci. USSR Div. Chem. Sci. (1963) 1829). Specifically, 250 g of 1,3-dichlorotetraisopropyldisiloxane (CAS No. 69304-37-6) and 282 9 g. of acetic anhydride were heated to about 138-146° C., whilst acetyl chloride was gently distilled off. Vacuum distillation furnished unreacted acetic anhydride and 266.2 g of 1,3-7-diacetoxytetraisopropyldisiloxane (106° C., 0.6 mbar, 73%) as a colourless liquid.

IR (film): 2951, 2873, 1731, 1466, 1371, 1261, 1244, 1099, 1018, 937, 886, 747, 695 cm$^{-1}$.

NMR data have been determined in $CDCl_3$ and are expressed as delta versus TMS.

$^{13}$C NMR: 170.3, 22.2, 16.8, 13.0; $^{29}$Si NMR: −11.8.

Example 1

40 g of 1,3-diacetoxytetraisopropyldisiloxane, prepared as described in the Preparative Example above, and 16.06 g of adipic acid were heated at about 145-180° C., whilst acetic acid was distillated out of the reactor over 6 hrs. A polymer with a solid content of 96.1%, a molecular weight of 4000 D (4 kD) and a viscosity of 80 dPa·s was obtained. The molecular weight decrease of a THF solution was monitored by GPC, as shown in FIG. 1 of the attached drawings.

NMR data have been determined in $CDCl_3$ and are expressed as delta versus TMS.

$^{13}$C NMR: 172.8, 35.6, 24.7, 17.0, 13.1; $^{29}$Si NMR: −11.38°.

Comparative Example 1 (According to Wooley et al, Macromolecules (1998) 31 15)

1.1325 g of bis(trimethylsilyl)adipate was reacted with 1.0318 g of 1,1,3,3-tetraisopropyldisiloxane at 135° C. for 14 days to produce poly(tetraisopropyldisilyl oxyl adipate) With a molecular weight of 2700.

Example 2

263 g of FORAL® AX-E (dihydroabietic acid) and 308 g of DYMEREX® (rosin dimer) were placed in a 1.2 liter flask equipped with a mechanical stirrer, a temperature control and small column with cooler and receiver. The mixture was melted by heating up to 220° C. Then 120 g of ethylsilyltriacetate was added and distillation of acetic acid began at 155° C. and ended at 175° C. The distillation was continued under a reduced pressure of 150 mbar for 1 hour. 92 g of acetic acid was distilled off, representing 100% of the acid that can be generated. The remaining resin was dissolved with 400 g of xylene and then cooled to ambient temperature. The solid content of the product was 60%.

The binder solution had a viscosity of 1 dpa·s at a solid content of 60%. A drawdown of the resin solution on a glass plate showed the next day a dry/clear film. The binder film developed a light haze upon immersion in water for 24 hours, but otherwise, did not show any significant changes with time. The film was then exposed to an alkaline solution of NaOH (pH value of 12.3) and exhibited hydrolysis and erosion at the surface, dissolving completely within one hour.

Preparative Example 2

1019.3 g of adipic acid, 581.6 g of neopentylglycol and 0.56 g of butylstannoic acid were heated at 150-230° C. whilst water distilled out of the reaction vessel. Xylene was then added and the last traces of water were removed by azeotropic distillation. This gave a polyester resin at 76.5% solids with an acid value of 91.9 mg KOH/g.

Example 3

423.5 g of the polyester prepared as in preparative example 2, 42.3 g of benzoic acid and 81.2 g of ethyltriacetoxysilane were heated at 155-175° C., whilst acetic acid distilled out of the reactor, over a 4 hour period. Final dilution with xylene furnished a polymer at 84% solids. A drawdown of the resin solution on a glass plate showed the next day a dry/clear film. The film was exposed to an alkaline solution of NaOH (pH value of 12.3) and slowly dissolved.

Preparative Example 3

34.2 g of L-Lactide (L-Lactic acid dimer) and 1.14 g of glycolic acid were melted at 110° C. A solution of 121 mg of tin di-octoate in 1 ml of toluene was then added. Polymerisation was then performed at a temperature of 110° C. for 3 hours. 1.5 g of succinic anhydride was then added to the polymer. After one hour at 110° C., the volatiles were stripped out of the reactor under vacuum. This gave a polymer, which had an acid value of 1.1.8 mg KOH/g.

Example 4

36.8 g of the polymer prepared as in preparative example 3 was heated at 100° C. 7.61 g of 1,3-diacetoxytetraisopropyl-disiloxane, prepared as described in the Preparative Example 1 above, was then added whilst acetic acid was distillated out of the reactor over 2 hours at a pressure of around 5 Torr. A polymer of a molecular weight of 6000 D was obtained. The molecular weight (MW) decrease of a THF solution was monitored by GPC. The MW was 4000 D after 96 hours at room temperature. A drawdown of the resin on a glass plate showed the next day a dry/clear film. The film was exposed to an alkaline solution of NaOH (pH value of 12.3) and slowly dissolved.

The reader's attention is directed, to all papers and documents which are filed concurrently with, or previous to this specification in connection with this application and which are open to public inspection, with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic-series of equivalent or similar features.

The invention is not restricted to the details of the foregoing embodiment(s). The invention extends to any novel one, or any novel combination, of the features disclosed in, this specification (including any accompanying claims, abstract and drawings), or to any novel one, or any novel combination, of the steps of any method or process so disclosed.

The invention claimed is:

1. A process for the preparation of poly(silyl ester)s comprising a structural unit of the formula (I)

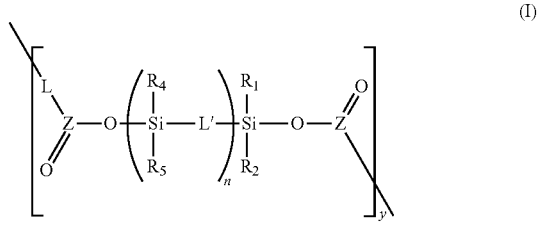

wherein each $R_4$ and $R_5$ is hydroxyl or is independently selected from hydrogen, alkyl, cycloalkyl, aryl, alkoxyl, aryloxyl, -L'-$SiR_1R_2$—, -L'-$(SiR_4R_5L')$n-$SiR_1R_2$—, alkenyl, alkynyl, aralkyl and aralkyloxyl radicals optionally substituted by one or more substituents independently selected from the group consisting of alkyl, alkoxyl, aralkyl, aralkyloxyl, hydroxyl, aryl, aryloxyl, halogen, amino and amino alkyl radicals, or each $R_4$ and/or $R_5$ is independently an —O—Z(O)-L- group terminating with —$SiR_1R_2R_3$ and/or —O—Z(O)—$R_7$, and wherein when $R_4$ or $R_5$ is selected as -L'-$(SiR_4R_5L')$n-$SiR_1R_2$—, the $R_4$ and $R_5$ groups attached to the silicon radical in the selected group are not themselves -L'-$(SiR_4R_5L')$n-$SiR_1R_2$—, wherein each $R_1$ and $R_2$ is independently selected from hydrogen, hydroxyl, alkyl, cycloalkyl, alkenyl, alkynyl, alkoxyl, -L'-$SiR_4R_5R_{10}$, aryl, aryloxyl, aralkyl and aralkyloxyl radical optionally substituted by one or more substituents independently selected from the group consisting of alkyl, alkoxyl, aralkyl, aralkyloxyl, aryl, aryloxyl, halogen, hydroxyl, amino and amino alkyl radicals, or each $R_1$ and/or $R_2$ is independently an —O—Z(O)-L- group terminating with —$SiR_1R_2R_3$ and/or —O—Z(O)—$R_7$, where $R_{10}$ has the same definition as $R_7$ below, wherein L represents a hydrocarbyl or substituted hydrocarbyl group, wherein said substituted hydrocarbyl is substituted by one or more substituents independently selected from the group consisting of alkyl, cycloalkyl, carboxyl, substituted carboxyl, alkoxyl, aralkyl, aralkyloxyl, aryl, aryloxyl, hydroxyl, halogen, amino radical, amino alkyl radical, and a polymer with pendant acid groups, L' represents O, S, $NR_6$, or L-$(NR_6$-L$)_p$ (where p=1 to 10), where $R_6$ has the same definition as $R_7$ below, or L, each n independently represents a number of —Si$(R_4)$$(R_5)$-L'- groups from 0 to 1000, and y represents a number from 2 to 100000, wherein the process comprises the step of reacting a polyacid of formula (II)

wherein Z(O)OH represents the acid moiety attached to L, m is an integer from 2 to 100000, and L is as defined above, with a polyacyloxysilyl derivative of formula (III)

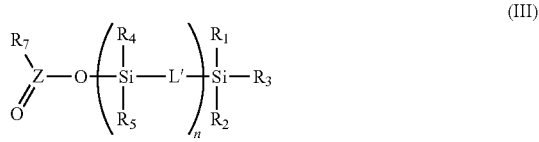

wherein $R_1$, $R_2$, $R_4$, $R_5$, L' and n are as defined above, and $R_7$ is a hydrogen atom, an aralkyl, aryl, alkenyl, alkynyl, or alkyl group optionally substituted with one or more substituents selected from the equivalent substituents as defined for $R_1$, $R_2$, $R_4$ and $R_5$ above,
and $R_3$ is the group —O—Z—(O)—$R_9$, where $R_9$ has the same definition as $R_7$,
while removing the formed acid group(s) of formula (IV), (V) and (VI), $$R_7Z(O)OH \quad (IV)$$

$$R_9Z(O)OH \quad (V)$$

$$R_8Z(O)OH \quad (VI),$$

from the system, wherein Z in formula (I), (II), (III), (IV), (V), and (VI) is independently C, POH, P or S=O
with a proviso that $R_1$, $R_2$, $R_4$ and $R_5$ in formula (III) is —O—Z(O)—$R_8$ when an equivalent group in formula (I) is —O—Z(O)-L-, wherein $R_8$ has the same definition as $R_7$.

2. A process according to claim 1, wherein y is 2 to 1000.

3. A process according to claim 1, wherein $R_4$ and $R_5$ each independently represent alkyl, an alkoxyl, an aryl, a hydroxyl group or -L'-(SiR_4R_5L')_n—SiR_1R_2— group, wherein L', $R_1$, $R_2$, $R_4$ and $R_5$ are as defined in claim 1.

4. A process according to claim 3, wherein n=0-100.

5. A process according to claim 3, wherein n=0-10.

6. A process according to claim 3, wherein n is 0 or 1.

7. A process according to claim 1, wherein $R_4$ and $R_5$ in formula (III) are each independently selected from the group consisting of an alkyl group, a hydroxyl group, an alkoxyl group and an L'-(SiR_4R_5L')_n—SiR_1R_2— group, wherein L', $R_1$, $R_2$, $R_4$ and $R_5$ are as defined in claim 1.

8. A process according to claim 7 wherein $R_1$, $R_2$, $R_4$ and $R_5$ each independently represent an alkyl group, branched or linear.

9. A process according to claim 1, wherein L' represents O.

10. A process according to claim 1, wherein $R_1$, $R_2$, $R_4$, $R_5$ and $R_8$ are each independently selected from the group consisting of methyl, ethyl, propyl, isopropyl, isobutyl, n-butyl, sec-butyl, t-butyl, phenyl, and vinyl.

11. A process according to claim 10, wherein $R_1$, $R_2$, $R_4$ and $R_5$ are selected from the group consisting of methyl, ethyl, isopropyl, phenyl, and vinyl.

12. A process according to claim 10, wherein $R_1$, $R_2$, $R_4$, $R_5$ and $R_8$ are methyl.

13. A process according to claim 1, wherein $R_6$ is methyl.

14. A process according to claim 1, wherein the groups $R_1$ and $R_2$ are the same.

15. A process according to claim 1, wherein the groups $R_7$ and $R_9$ are the same.

16. A process according to claim 15, wherein $R_7$ and $R_9$ are alkyl.

17. A process according to claim 15, wherein $R_7$ and $R_9$ are methyl.

18. A process according to claim 1, wherein the polyacid of formula (II) is a polycarboxylic acid.

19. A process according to claim 18, wherein the polycarboxylic acid is a dicarboxylic acid.

20. A process according to claim 19, wherein the dicarboxylic acid is selected from adipic acid, oxalic acid, succinic acid, glutaric acid , phthalic or isophthalic or terephthalic acids, di-lactic acid, and rosinous dicarboxylic acids.

21. A process according to claim 1, wherein L represents an alkyl, aryl, alkenyl, alkynyl, or aralkyl radical, or a polymer comprising 1 to 10000 carbon atoms.

22. A process according to claim 1, wherein L represents —(CH_2)_n—, and n is an integer between 1 and 10.

23. A process according to claim 22, wherein L represents —(CH_2)_n—, and n is an integer between 2 and 8.

24. A process according to claim 22, wherein L represents —(CH_2)_n—, and n is an integer between 4 and 6.

25. A process according to claim 22, wherein L represents —(CH_2)_n—, and n is 4.

26. A process according to claim 1, wherein the polyacyloxysilyl derivatives of formula (III) are selected from tetraisoproply-1,3-diacetoxydisiloxane, tetramethyl 1,3-diacetoxydisiloxane, dimethyldiacetoxysilane, diethyldiacetoxysilane, diphenyldiacetoxysilane, vinylmethyldiacetoxysilane, methyltriacetoxysilane, ethyltriacetoxysilane, vinyltriacetoxysilane, phenyltriacetoxysilane, tetraacetoxysilane, (butanoic acid, 1,3,5-triethyl-1,3,5-tripropyl-1,5-trisiloxanediyl ester), (1,5-trisiloxanediol-1,3,5-triethyl-1,3,5-tripropyl-dipropanoate), (2-silanaphthalen-2-ol-1,2,3,4-tetrahydro-2-(7-hydroxy-1,1,3,3,5,5,7,7-octamethyltetrasiloxanoxy)-diacetate), (2-silanaphthalen-2-ol-1,2,3,4-tetrahydro-2-(5-hydroxy-1,1,3,3,5,5-hexamethyltrisiloxanoxy)-diacetate), (2-silanaphthalen-2-ol-1,2,3,4-tetrahydro-2-(3-hydroxy-1,1,3,3-tetramethyldisiloxanoxy)-diacetate), (1,9-pentasiloxanediol-1,3,5,7,9-pentamethyl-1,3,5,7,9-pentavinyl-diacetate), (1,7-tetrasiloxanediol-1,3,5,7-tetraethenyl-1,3,5,7-tetramethyl-diacetate), (1,7-tetrasiloxanediol-1,1,3,3,5,5,7,7-octaethyl-diacetate), (1,5-trisiloxanediol-1,3,5-triethenyl-1,3,5-trimethyl-diacetate), (heptasiloxane-1,1,1,13-tetraacetoxy-3,3,5,5,7,7,9,9,11,11,13,13-dodecamethyl), (1,5-trisiloxanediol-1,3, 5-triethyl-1,3,5-trimethyl-diacetate), (1,5-trisiloxanediol-1,1,3,3,5,5-hexaethyl-dibutyrate), (1,5-trisiloxanediol-1,1,3,3,5,5-hexaethyl-dipropionate), (1,5-trisiloxanediol-1,3,5-triethyl-1,3,5-tripropyl-diacetate), (1,5-trisiloxanediol-1,1,3,3,5,5-hexaethyl-diacetate), (1,1,1,7-tetrasiloxanetetrol-3,3,5,5,7,7-hexamethyl-triacetate), (1,5-trisiloxanediol-1,1,3,3,5,5-pentamethyl-3-vinyl-diacetate), (1-tetrasiloxanol-7-acetyl-1,1,3,3,5,5,7,7-octamethyl-acetate), (l-pentasiloxanol-9-acetyl-1,1,3,3,5,5,7,7,9,9-decamethyl-acetate; pentasiloxanol-9-acetyl-1,1,3,3,5,5,7,7,9,9-decamethyl-acetate), (1,9-pentasiloxanediol-decamethyl-diacetate), (1,5-trisiloxanediol-hexamethyl-diacetate), (1,17-nonasiloxanediol-octadecamethyl-diacetate), (1,15-octasiloxanediol-hexadecamethyl-diacetate), (1,7,13-heptasiloxanetriol-tridecamethyl-triacetate), (1,1,7-tetrasiloxanetriol-1,3,3,5,5,7,7-heptamethyl-triacetate), (1,13-heptasiloxanediol-tetradecamethyl-diacetate), (1,7-tetrasiloxanediol-1,1,3,3,5,5,7,7-octamethyl-diacetate), ditert-butyldiacetotoxysilane, and ditert-butoxydiacetoxysilane.

27. A process according to claim 1, wherein the reaction is carried out in a suitable solvent.

28. A process according to claim 27, wherein the solvent is selected from pentane, cyclopentane, hexane, cyclohexane, heptane, toluene, xylene, benzene, mesitylene, ethylbenzene, octane, decane, decahydronaphthalene, diethyl ether, diisopropyl ether, diisolbutyl ether, N,N-dimethylformamide, N-methylpyrrolidone, N,N-dimethylacetamide, and mixtures thereof.

29. A process according to claim 27, wherein the solvent forms a heterogeneous low boiling azeotrope with distilled poly(silyl ester)s comprising the structural unit of the formula (I).

30. A process according to claim 1, wherein the molar ratio of the reactive groups present in the polyacyloxysilyl derivative to the reactive groups present in the acid is between 1:100 and 100:1.

31. A process according to claim 1, wherein the solvent, where present, is at least 10 wt% of the total reaction mix at the start of the reaction.

32. A process according to claim 1, wherein the molecular weight is in the range 1000 to 1000000 KD.

33. A process according to claim 32, wherein the molecular weight is in the range 1000 to 100000 kD.

34. A process according to claim 32, wherein the molecular weight is in the range 1000 to 10000 kD.

35. A process according to claim 1, wherein m is 2.

36. A process according to claim 1, wherein each $R_4$ and $R_5$ is hydroxyl or is independently selected from alkyl, aryl, alkoxyl, aryloxyl, -L'-$SiR_1R_2$—, -L'-$(SiR4R_5L')_n$—$SiR_1R_2$—, alkenyl, alkynyl, aralkyl and aralkyloxyl radicals optionally substituted by one or more substituents independently selected from the group consisting of alkyl, alkoxyl, aralkyl, aralkyloxyl, hydroxyl, aryl, aryloxyl, halogen, amino and amino alkyl radicals, or $R_4$ or $R_5$ is independently an —O—C(O)-L- group terminating with —$SiR_1R_2R_3$ and/or —O—Z(O)—$R_7$, and wherein when $R_4$ or $R_5$ is selected as -L'-$(SiR_4R_5L')$n-$SiR_1R_2$—, the $R_4$ and $R_5$ groups attached to the silicon radical in the selected group are not themselves -L'-$(SiR_4R_5 L')$n-$SiR_1R_2$—;

wherein each $R_1$ and $R_2$ is independently selected from hydrogen, hydroxyl, alkyl, alkenyl, alkynyl, alkoxyl, aryl, aryloxyl, aralyl and aralkyloxyl radical optionally substituted by one or more substituents independently selected from the group consisting of alkyl, alkoxyl, aralkyl, aralkyloxyl, aryl, aryloxyl, halogen, hydroxyl, amino and amino alkyl radicals, or $R_1$ or $R_2$ is independently selected from an —O—C(O)-L- group terminating with —$SiR_1R_2R_3$ and/or —O—Z(O)—$R_7$, wherein L represents a hydrocarbyl or substituted hydrocarbyl group, wherein said substituted hydrocarbyl is substituted by one or more substituents independently selected from the group consisting of alkyl, alkoxyl., aralkyl, aralkyloxyl, aryl, aryloxyl, hydroxyl, halogen, amino and amino alkyl radicals, or a polymer with pendant acid groups; and L' represents O, S, or $NR_6$, where $R_6$ is defined as is $R_7$, or L.

37. A process according to claim 1 which includes the additional step of incorporating the polymer in a film or coating composition.

38. A poly (silyl ester) comprising the repeating group (I) as defined in claim 1, and wherein L is a polylactic acid or substituted polylactic acid residue or a rosin or substituted rosin residue of a polycarboxylic acid.

39. A coating or film composition comprising a poly(silyl ester) according to claim 38.

40. A coating or film composition according to claim 39 wherein the composition is suitable for use in medical and/or veterinary applications to provide controlled release of a bioactive substance.

41. An implantable medical and/or veterinary device having a coating comprising a coating or film composition according to claim 39.

42. An implantable medical and/or veterinary device having a coating comprising a coating or film composition comprising a poly(silyl ester) prepared by the process of claim 1.

43. A process according to claim 1, wherein in the definitions of $R_1$, $R_2$, $R_4$ or $R_5$ the amino radical is a tertiary amino radical.

44. A process according to claim 1, wherein Z represents C.

* * * * *